United States Patent [19]

Valentine et al.

[11] 4,021,669

[45] May 3, 1977

[54] NUCLEAR FUEL MICROSPHERE GAMMA ANALYZER

[75] Inventors: Kenneth H. Valentine; Ernest L. Long, Jr., both of Oak Ridge; Melvin G. Willey, Knoxville, all of Tenn.

[73] Assignee: The United States of America as represented by the United States Energy Research and Development Administration, Washington, D.C.

[22] Filed: Mar. 15, 1976

[21] Appl. No.: 666,534

[52] U.S. Cl. ............................ 250/328; 209/111.5; 250/359

[51] Int. Cl.² ......................................... G01T 1/00

[58] Field of Search ............. 250/304, 328, 358 R, 250/359, 360, 364, 432, 435; 209/111.5

[56] References Cited

UNITED STATES PATENTS

| | | | |
|---|---|---|---|
| 3,259,744 | 7/1966 | Gorecki et al. | 250/359 X |
| 3,527,942 | 9/1970 | Roe et al. | 250/328 |
| 3,655,964 | 4/1972 | Slight | 250/359 X |
| 3,784,826 | 1/1974 | Bagshawe et al. | 250/328 |

*Primary Examiner*—Davis L. Willis
*Attorney, Agent, or Firm*—Dean E. Carlson; David S. Zachry; Louis M. Deckelmann

[57] ABSTRACT

A gamma analyzer system is provided for the analysis of nuclear fuel microspheres and other radioactive particles. The system consists of an analysis turntable with means for loading, in sequence, a plurality of stations within the turntable; a gamma ray detector for determining the spectrum of a sample in one section; means for analyzing the spectrum; and a receiver turntable to collect the analyzed material in stations according to the spectrum analysis. Accordingly, particles may be sorted according to their quality; e.g., fuel particles with fractured coatings may be separated from those that are not fractured, or according to other properties.

4 Claims, 3 Drawing Figures

NUCLEAR FUEL MICROSPHERE GAMMA ANALYZER

BACKGROUND OF THE INVENTION

This invention was made in the course of, or under, a contract with the Energy Research and Development Administration.

The present fuel specification for commercial high temperature gas-cooled reactors (HTGR's) sets the failed particle (breach in coating) fraction at no more than 0.01 after full irradiation exposure. The most common method of estimating failed particle statistics is through the metallographic inspection of polished sections of irradiated fuel rods. Only 20–50 particles may be seen in a single section and since at least 300 particles must be inspected to give a 95% confidence level that the failed fraction is 0.01 or less, the method is costly and time-consuming. Although the above method might be suitable for a few test fuel rods, it clearly is not amendable to the analysis of the quantity of fuel particles used in an operating HTGR. Accordingly, there exists a need for a more rapid and inline method of particle analysis. The present invention was conceived to meet this need in a manner to be described hereinbelow. The invention also may be used for evaluating other radioactive particles.

SUMMARY OF THE INVENTION

It is the object of the present invention to provide an improved device and method for the rapid analysis and subsequent sorting of nuclear fuel microspheres.

The above object has been accomplished in the present invention by providing a microsphere analyzer comprising a rotatable table for conveying fuel particle(s) from a loading position to an inspection position and thence to an unloading position; a gamma-ray detector located adjacent to the inspection position; a second rotatable table for receiving particles, from the first table at the unloading position, in a plurality of receptacles depending upon the quality of the fuel particles; means for introducing fuel particles to the first table at the loading position; and means connected to the detector to analyze the gamma ray spectrum so as to determine the quality of particles and thus determine the appropriate receptacles of the second table for receiving the particles from the first table.

DESCRIPTION OF THE PREFERRED EMBODIMENT

Figure 1:
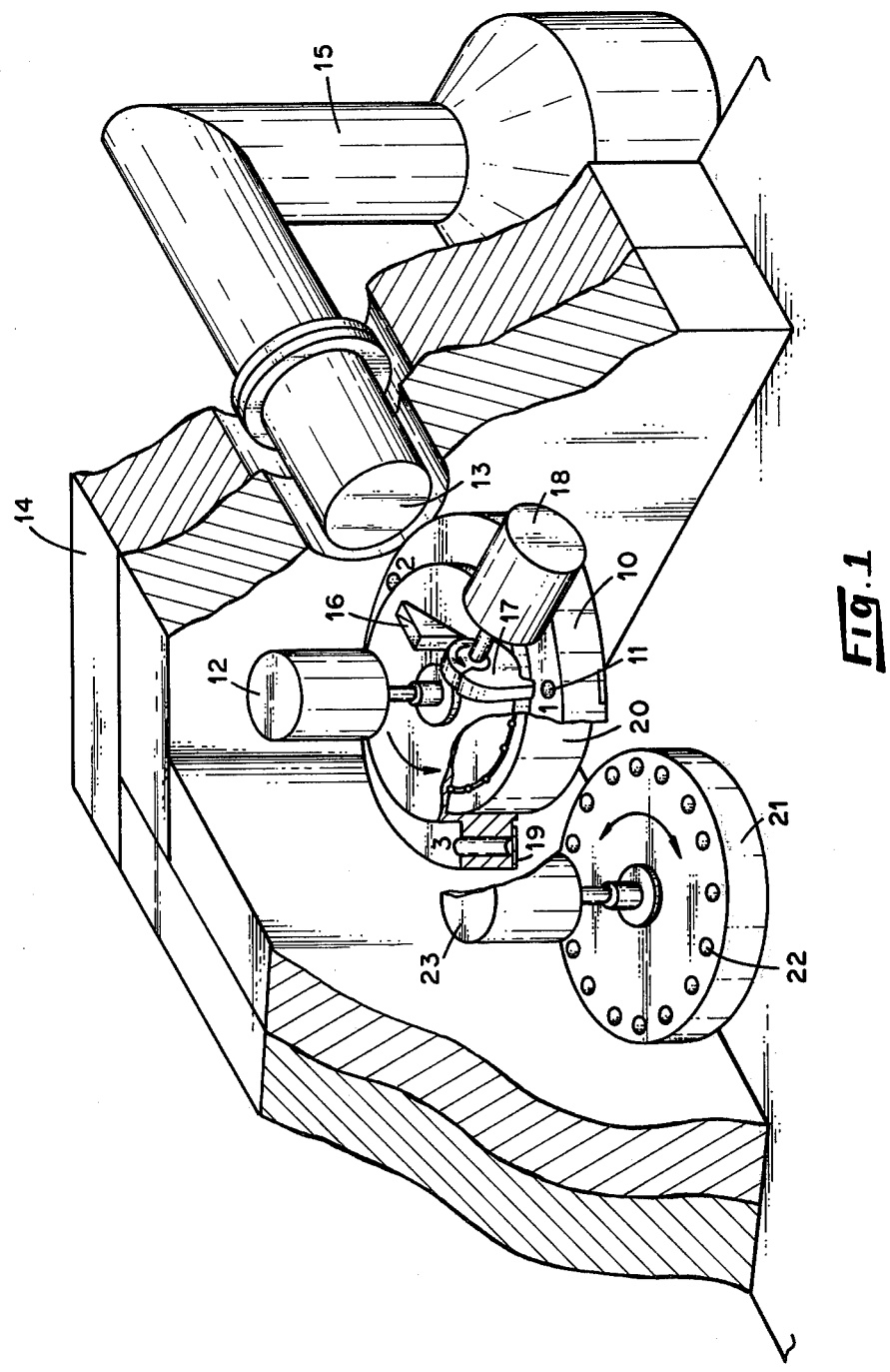
FIG. 1 is an isometric view partly in cutaway, of the microsphere gamma-ray analyzer of the present invention.

The particle analyzer of the present invention is illustrated in FIG. 1 of the drawings which will now be described. In FIG. 1, a sample changer turntable 10 is provided with a plurality of sample-receiving chambers 11. These chambers, preferably, are positioned 120° apart to provide adequate shielding between chambers. The changer 10 is unidirectionally rotated by a motor 12 to one of three positions such that one chamber 11 is intermittently held at a position aligned with a gamma-ray detector 13 projecting through a shielding wall 14. The detector 13, typically a lithium-drifted germanium detector, is mounted on a support-cooling system 15.

Figure 3:
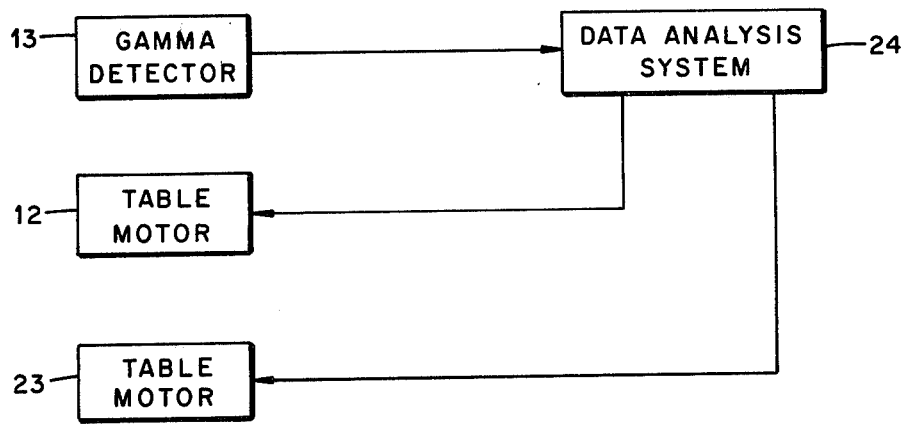
FIG. 3 is a schematic diagram of the data acquisition control system of the present invention.

When a chamber 11 in the turntable 10 is positioned at the gamma detector 13 (data acquisition position), a trailing chamber 11 is aligned with filling equipment (loading position) which, in a preferred form, includes a particle singularizer having a feed hopper 16, a rotatable drum 17 provided with a particle dispensing nozzle, and a motor 18. This loading equipment permits the entry of any desired number of fuel particles into a chamber 11. Other loading equipment may be used provided that the equipment reliably feeds the desired quantity and does not damage the particles. Each chamber 11 is provided with a spring-loaded door 19, and each door is operated sequentially by a single stationary electric solenoid, not shown, positioned at the particle unloading position. It should be understood that the electrical control circuit, not shown, for the solenoid is connected to an external control and data analysis system 24 such as shown in FIG. 3.

A second turntable 21 is positioned beneath the turntable 10 so that one of a plurality of receptacles 22 in turntable 21 may be located beneath a third position of chamber 11 of turntable 10. The turntable 21 is rotated bidirectionally by a motor 23. Although not shown, the receptacles 22 each may be provided with an unloading solenoid actuated spring-loaded door in the same manner as for the turntable 10 for subsequent unloading into suitable collectors, not shown.

The motors 12 and 23 are operated, at appropriate times, by signals derived from an electrical control data analysis system external to the cell wall 14. This electrical system is connected to, or is a part of the data collection and analysis circuitry connected with the gamma ray detector 13, such as broadly illustrated in FIG. 3 of the drawings, wherein the detector 13 is coupled to the data analysis system 24, which in turn controls the motors 12 and 23 at appropriate times. Although not shown in FIG. 3, the motor 18 of FIG. 1 is also controlled by the system 24.

In normal operation of the analyzer of FIG. 1, one or more fuel particles are placed in a chamber 11 at position 1, through the operation of the singularizer equipment 16–18. Motor 12 is then energized to move the collected sample to position 2 adjacent the detector 13. While data is being acquired at position 2, another sample may be loaded at position 1 into another chamber 11. When data acquisition at position 2 is complete (which takes longer than a loading operation), motor 12 is again operated to rotate the sample to position 3 and bring a new sample to position 2. During the taking of data for the new sample, the data for the previous sample are analyzed and the results (depending upon the set criteria) cause motor 23 to be operated to bring an appropriate receptacle 22 beneath position 3 and thereafter the door 19 of the chamber 11 at position 3 is opened to transfer the sample into that particular receptacle 22. In this manner, for example, samples containing no coating failures may be placed in a certain receptacle 22 while samples with a few or many cracked particles may be placed in other receptacles 22.

It should be understood that the above operations may be controlled by a computer program entered into a central processing unit (CPU) memory. The nature of the analysis is completely flexible and depends on the type of program that is loaded into the CPU prior to start-up. One possibility would be a general search routine which locates, integrates, and catalogues all significant peaks in the spectrum. Regardless of what type of program is used, analysis and acquisition will occur concurrently. Thus, the system will be capable of separating a batch of particles into subgroups based on some characteristic of the gamma spectrum. Some possibilities are the following:

1. Low or high $^{137}Cs/^{95}Zr$ ratio for separating failed from unfailed particles.
2. Division into three or more groups based on $^{137}Cs/^{95}Zr$ ratio for correlating Cs release with some physical property (determined later by metallography).
3. Presence or absence of $^{233}Pa$ peak for separating fertile from fissile particles.

Figure 2:
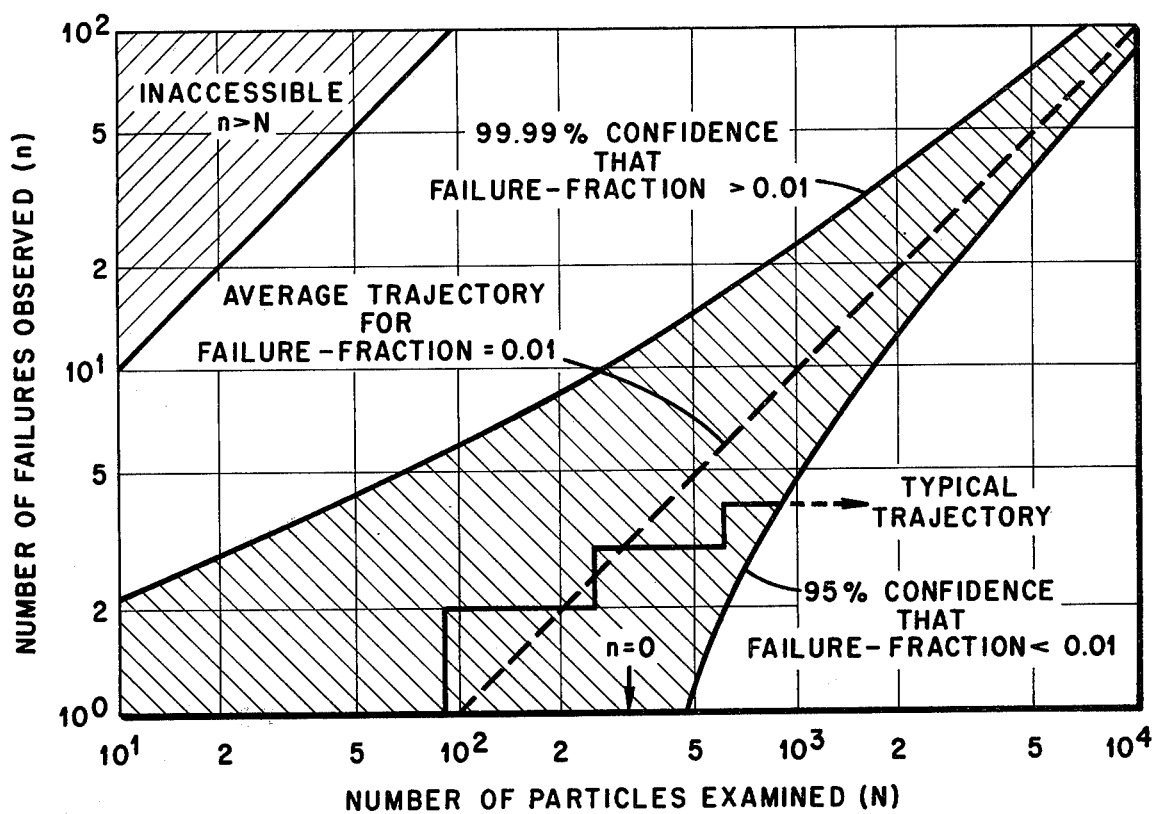
FIG. 2 is a graph illustrating the confidence level for fuel particle examination as used in conjunction with the apparatus of FIG. 1.

FIG. 2 illustrates how the above gamma analyzer could be used to establish acceptability of a particular fuel concept. For this application, particles would be fed through the analyzer individually; and failed, not-failed decision would be made for each particle. For the typical trajectory, which is shown in the figure, the first failure is found during the 30th examination; the second during the 90th examination; the third during the 250th examination; and the fourth during the 600th examination. No more failures are detected up to the 911th examination at which time the trajectory crosses the line labeled "95% confidence that the failure-fraction < 0.01." The intersection of a trajectory with any point on this line yeilds 95% confidence that the fuel failure-fraction < 0.01. Similarly, the intersection of a trajectory with any point on the line labeled "99.99% confidence that the failure-fraction > 0.01" yields 99.99% confidence that the failure-fraction is > 0.01. This line is included to provide a clear-cut criterion for terminating the examination of fuels which have a true failure-fraction in excess of 0.01. Although the 99.99% confidence coefficient was chose arbitrarily for illustrative purposes, practical values should probabaly be fairly high to minimize the probability of rejecting a fuel which is actually acceptable.

This invention has been described by way of illustration rather than by limitation and it should be apparent that it is equally applicable in fields other than those described.

What is claimed is:

1. A gamma analyzer system for the analysis and sorting of radioactive particles, comprising a first sample changer turntable provided with three particle sample-receiving chambers positioned 120° apart; a first motor coupled to said first turntable for unidirectional rotation thereof to one of three positions; with respective ones of said chambers located at respective ones of said three positions; means aligned with one of said sample-receiving chambers for dispensing a desired number of said particles thereinto at a first one of said three positions; a gamma ray detector positioned adjacent to the next one of said chambers at the second one of said three positions for the acquisition of data from particles loaded therein while it was at said first one position; a second turntable positioned beneath said first turntable and provided with a plurality of respective receptacles; a second motor coupled to said second turntable for bidirectional rotation thereof such that a selected one of said receptacles is positioned in alignment with the third one of said chambers of said first turntable at the third one of said positions; a respective spring-loaded door mounted at the bottom of each of said sample-receiving chambers of said first turntable, a stationary electric solenoid positioned at said third one of said positions for sequentially operating each of said chamber doors at said third one of said positions such that when one of said chambers is at said third one of said positions, the already analyzed particles contained therein may be released therefrom into said selected aligned one of said receptacles of said second turntable by opening the associated chamber door by activation of said solenoid; and a data acquistion system coupled to said gamma ray detector, said data acquisition system coupled to and providing control signals to each of said motors and to said door control solenoid wherein groups of one or more particles are sequentially loaded into respective ones of said chambers of said first turntable at said first one of said positions, respective ones of said loaded chambers are then sequentially analyzed by said detector at said second one of said positions, and finally respective ones of said loaded and analyzed chambers are sequentially unloaded into selected ones of said receptacles of said second turntable at said third one of said positions as a function of the analyzed results of said data acquisition system such that the sorting of particles is effected.

2. The analyzer system set forth in claim 1, wherein a respective electric solenoid actuated particle release spring-loaded door is mounted at the bottom of each of said receptacles of said second turntable.

3. The anaylzer system set forth in claim 1, wherein said gamma ray detector is a lithium-drifted germanium detector.

4. The analyzer set forth in claim 1, wherein said particle dispensing means is a particle singularizer provided with a feed hopper, a rotatable drum with a particle dispensing nozzle, and a third motor for driving said drum, said third motor receiving control signals form said data acquisition system.

* * * * *